US008813601B2

(12) United States Patent
Hind et al.

(10) Patent No.: US 8,813,601 B2
(45) Date of Patent: Aug. 26, 2014

(54) BREAK-AWAY RETAINER FOR INSTALLATION OF PARK BRAKE

(75) Inventors: Christopher George Arthur Hind, Tottenham (CA); Peter Revelis, Newmarket (CA); Simon Kwan Hoi Chan, Markham (CA); Jaafar Bashiry-Khoshraftar, Richmond Hill (CA)

(73) Assignee: Ventra Group, Inc., Bradford (CA)

( * ) Notice: Subject to any disclaimer, the term of this patent is extended or adjusted under 35 U.S.C. 154(b) by 125 days.

(21) Appl. No.: 13/227,285

(22) Filed: Sep. 7, 2011

(65) Prior Publication Data
US 2013/0055848 A1   Mar. 7, 2013

(51) Int. Cl.
*G05G 1/04*   (2006.01)

(52) U.S. Cl.
USPC .......................................................... 74/523

(58) Field of Classification Search
USPC ............. 74/519, 523, 526; 403/300, 310, 371
See application file for complete search history.

(56) References Cited

U.S. PATENT DOCUMENTS

| 3,795,295 | A | 3/1974 | Reno |
| 4,421,333 | A | 12/1983 | Van Dyke |
| 4,945,784 | A | 8/1990 | Gergoe |
| 5,839,304 | A | 11/1998 | Wills |
| 5,875,689 | A | 3/1999 | Huebner |
| 5,907,977 | A | 6/1999 | Huebner et al. |
| 5,970,814 | A * | 10/1999 | Smith et al. ................ 74/473.15 |
| 6,457,207 | B1 | 10/2002 | Horberg |
| 6,877,395 | B2 | 4/2005 | Reese et al. |
| 2006/0175157 | A1 | 8/2006 | Villa et al. |
| 2006/0249343 | A1 | 11/2006 | Prottengeier et al. |
| 2007/0152471 | A1 | 7/2007 | Zagoroff |

FOREIGN PATENT DOCUMENTS

| EP | 2 088 020 A1 | 8/2009 | |
| GB | 2248280 A * | 4/1992 | ............. B60T 11/04 |
| GB | 2 281 099 A | 2/1995 | |
| JP | 07069186 A * | 3/1995 | ............... B60T 7/06 |
| JP | 08011687 A * | 1/1996 | ............... B60T 7/06 |
| JP | 408011687 A | 1/1996 | |

OTHER PUBLICATIONS

Extended European Search Report dated Jan. 22, 2014 of European Application No. 08163170.7 (12 pages).

* cited by examiner

*Primary Examiner* — Vicky Johnson
(74) *Attorney, Agent, or Firm* — Pillsbury Winthrop Shaw Pittman LLP

(57) ABSTRACT

Provided is a retainer for assisting in installation of a parking brake actuator for use in a vehicle by limiting relative movement of an input lever and a mounting bracket. The retainer has a first part and a second part connected via frangible connection(s). The first part of the retainer is fixed relative to a mounting bracket and the second part is fixed relative to the input lever (via a pivot member). After installation, the lever is moved from its first, installation position to a second, in-use position. The application of force and movement of the lever rotates the pivot member, which rotates the second part of the retainer relative to the first part thereby breaking the frangible connection(s). The input lever of the brake actuator is then ready for use to apply or release brakes of the vehicle.

26 Claims, 7 Drawing Sheets

BREAK-AWAY RETAINER FOR INSTALLATION OF PARK BRAKE

FIELD

The present invention relates to a retainer used during installation of a parking brake actuator in a vehicle.

DESCRIPTION OF RELATED ART

Installation of parts of a parking brake in a vehicle can be difficult. For example, the mounting bracket of the actuator for installation inside the passenger compartment is free to move and/or rotate while being handled (e.g., by an assembly operator), and can easily fall off of the pivot member. This has made it more difficult and time consuming to assemble. It has also increased the risk of the mount bracket being damaged while it is being transported, handled, and assembled.

Some attempts to limit movement of the mounting bracket during assembly of the parking brake actuator include using materials (such as glue) to temporarily hold the mounting bracket relative to the pivot member during installation. However, such materials can be messy and difficult to remove after installation, which may also add more time to the installation process.

Thus, an improved method and device for installing parts of a parking brake into a vehicle would be beneficial.

SUMMARY

One aspect of this disclosure provides a brake actuator for use in a motor vehicle having one or more vehicle brakes actuable by a cable system with one or more cables. The brake actuator has: a mounting bracket configured for attachment within a passenger compartment of the vehicle; an input lever mounted for pivotal movement with respect to the mounting bracket in opposing brake applying and releasing directions; an output member movable by the input lever and constructed to be connected to the one or more cables of the cable system to apply and release tension as the input lever is moved in the brake applying and releasing directions, respectively; and a retainer having a first part fixed with respect to the mounting bracket and a second part fixed with respect to the input lever. The first and second parts are connected by a frangible connection to temporarily retain the input lever and mounting bracket against relative pivotal movement for installation. The frangible connection is configured to break in response to a threshold force being applied to pivotally move the input lever relative to the mounting bracket to thereafter permit movement of the input lever in the brake applying and brake releasing directions.

Another aspect of the disclosure provides a brake actuator for use in a motor vehicle having one or more vehicle brakes actuable by a cable system with one or more cables. The brake actuator has: a mounting bracket configured for attachment within a passenger compartment of the vehicle; a pivot member configured for rotation about an axis and operatively connected to an input lever; the input lever configured for rotation in opposing brake applying and releasing directions and configured to rotate the pivot member about its axis; an output member movable by the input lever and constructed to be operatively connected to the one or more cables of the cable system to apply and release tension as the input lever is moved in the brake applying and releasing directions, respectively; and a retainer comprising a first part and a second part connected by at least one frangible connection. The first part of the retainer is connected to the mounting bracket and the second part of the retainer is connected to the pivot member. The second part of the retainer is configured to rotate with the pivot member and the at least one frangible connection is configured to temporarily retain the pivot member and mounting bracket against relative pivotal movement for installation. The at least one frangible connection is configured to break in response to a threshold force being applied to pivotally move the input lever and the pivot member relative to the mounting bracket such that the second part of the retainer rotates relative to the first part of the retainer to thereafter permit movement of the input lever in the brake applying and brake releasing directions.

Another aspect of the disclosure provides a brake actuator for use in a motor vehicle having one or more vehicle brakes actuable by a cable system with one or more cables. The brake actuator has: a mounting bracket configured for attachment within the passenger compartment of the vehicle; an input lever configured for rotation in opposing brake applying and releasing directions and connected to the mounting bracket, the input lever being provided in a first position for installation in the vehicle and configured to be moved to a second position for use to apply and release the one or more vehicles brakes; a pivot member configured for rotation about an axis connected to the mounting bracket and operatively connected to the input lever, the input lever configured to rotate the pivot member about its axis; an output member constructed to be operatively connected to the one or more cables of the cable system and spaced axially from the input member, with the pivot member being operatively connected to the output member to affect its movement in the brake applying and releasing directions; and a retainer comprising a first part and a second part connected by one or more frangible connections. The first part of the retainer is connected to the mounting bracket and the second part of the retainer is connected to an end of the pivot member. The retainer limits rotation of the pivot member and the input lever relative to the mounting bracket. Upon movement of the input lever to its second position, the pivot member is configured to rotate about its axis to rotate the second part of the retainer thereby breaking the one or more frangible connections between the first part and the second part, such that the input lever is configured for use in brake applying and brake releasing directions.

Yet another aspect of the disclosure provides a method for installing a parking brake actuator within a passenger compartment of a vehicle. The parking brake actuator is for use in a motor vehicle and has: a first mounting bracket and a second mounting bracket each configured for attachment within the passenger compartment of the vehicle, an input lever configured for rotation in opposing brake applying and releasing directions and connected to the first and second mounting brackets, the input lever being provided in a first position for installation in the vehicle and configured to be moved to a second position for use to apply and release the one or more vehicles brakes, a pivot member configured for rotation about an axis connected to the first and second mounting brackets and operatively connected to the input lever, the input lever configured to rotate the pivot member about its axis, an output member constructed to be operatively connected to the one or more cables of the cable system and spaced axially from the input member, with the pivot member being operatively connected to the output member to affect its movement in the brake applying and releasing directions, and a retainer comprising a first part and a second part connected by at least one frangible connection. The first part of the retainer is connected to the first mounting bracket and the second part of the retainer is connected to an end of the pivot member. The method includes:

attaching the first mounting bracket and second mounting bracket in the passenger compartment using attachment devices, connecting the output member to the one or more cables of the cable system, and moving the input lever from the first position for installation to the second position for use to apply and release the one or more vehicles brakes using the parking brake actuator.

The moving of the input lever rotates the pivot member about the axis, and the second part of the retainer rotates with the rotation of the pivot member thereby breaking the one or more frangible connections of the retainer.

These and other aspects of the disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION

Figure 8:
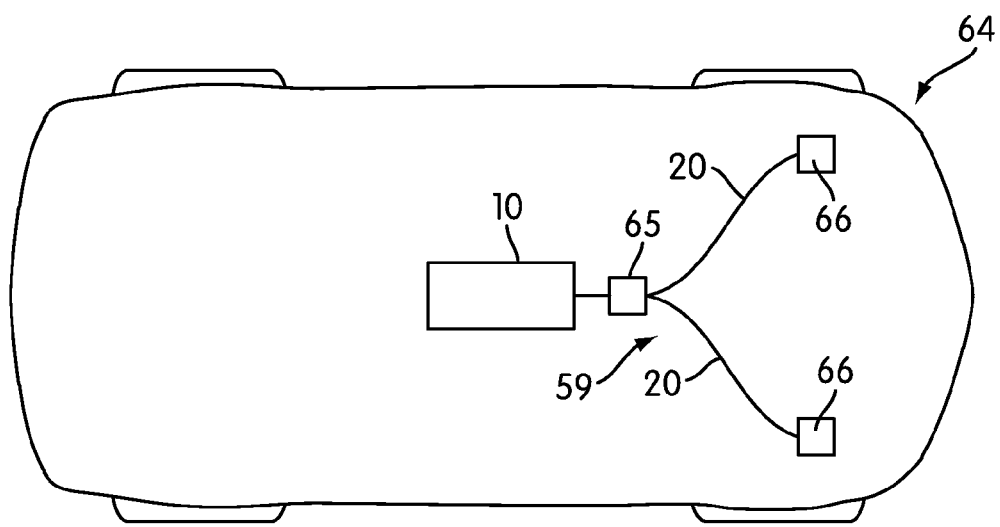
FIG. 8 illustrates a schematic of the brake actuator in a motor vehicle.

Disclosed is a parking brake actuator 10 constructed to activate a braking mechanism 66 on a motor vehicle 64 (e.g., see FIG. 8). The braking mechanism 66 comprises one or more vehicle brakes actuable by a cable system 59 having one or more cables 20. Parts of the parking brake actuator 10 are connected and installed within a passenger compartment of the vehicle 64 using a retainer 70.

Figure 1:
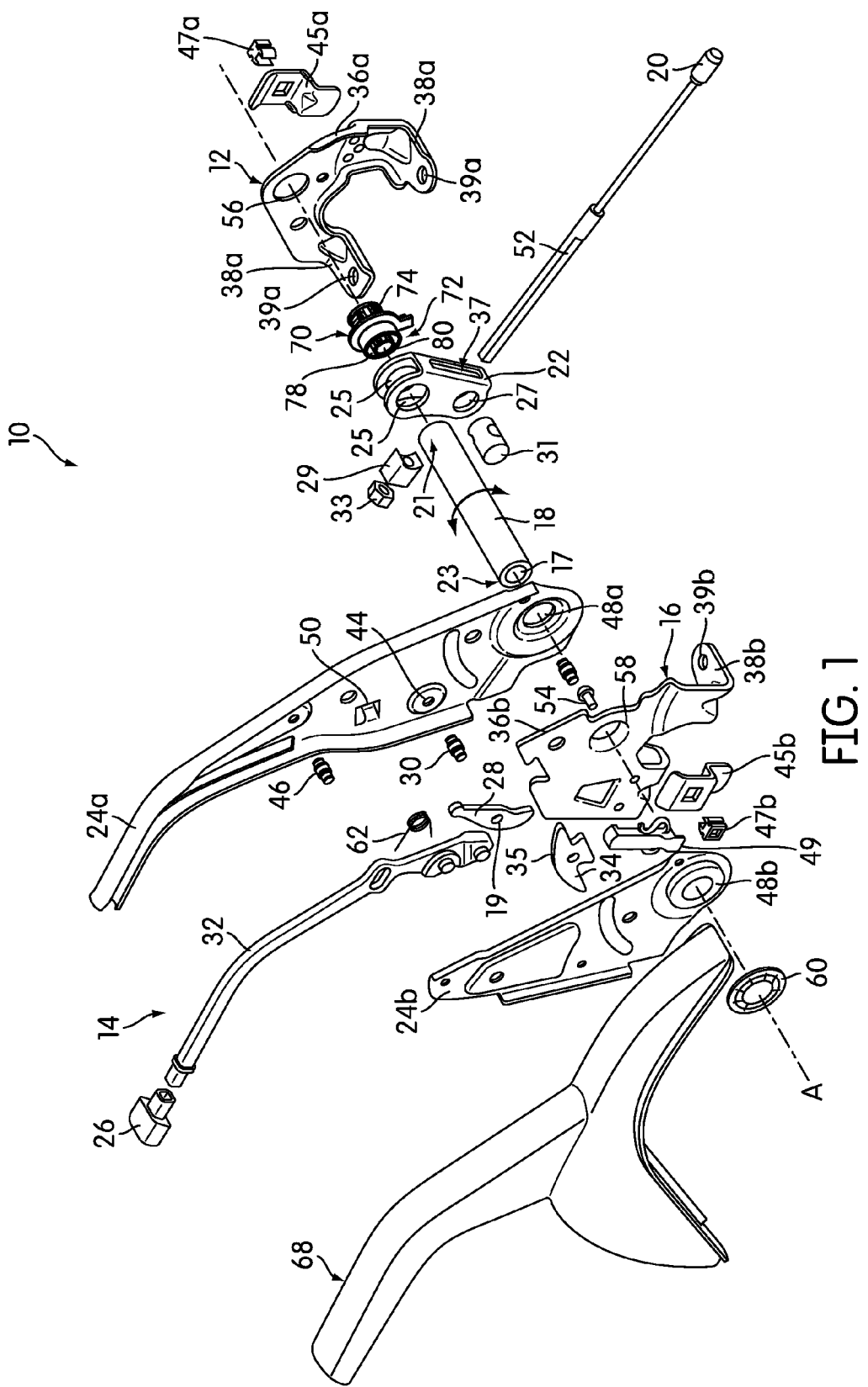
FIG. 1 is an exploded perspective view of a parking brake actuator.

In FIG. 1, the brake actuator 10 has a first (left) mounting bracket 12 that is configured for attachment and capable of being affixed to an interior part of the passenger compartment (e.g., floor) of a motor vehicle 64 (e.g., see FIG. 8). The first mounting bracket 12 has a horizontal base plate(s) or bottom section(s) 38a in contact with the floor of the motor vehicle 64, and a vertical section 36a in the form of a support plate. Both the horizontal bottom section(s) 38a and the vertical section 36a are provided with a plurality of holes 39a for securement and/or connection with the vehicle and/or parts of the parking brake actuator. In an embodiment, as shown in the Figures, horizontal base plate 38a comprises two bottom section(s) for securement to a vehicle floor.

Similarly, a second (right) mounting bracket 16 that is configured for attachment and capable of being affixed to an interior part of the passenger compartment (e.g., floor) of motor vehicle 64 is also provided. The second mounting bracket 16 has a horizontal base plate(s) or bottom section(s) 38b in contact with the floor of the motor vehicle 64, and a vertical section 36b in the form of a support plate. Both the horizontal bottom section(s) 38b and the vertical section 36b are provided with a plurality of holes 39b for securement and/or connection with the vehicle and/or parts of the parking brake actuator. In an embodiment, as shown in the Figures, horizontal base plate 38b comprises two bottom section(s) for securement to a vehicle floor.

Additionally, console brackets 45a and 45b may be provided and attached (e.g., projection welded) to their respective first mounting bracket 12 and second mounting bracket 16. The console brackets 45a and 45b are configured to receive console clips 47a and 47b in corresponding holes therein. The console clips 47a and 47b are configured to be secured to a center console. The console clips 47a and 47b are clipped into the holes of the console brackets 45a and 45b, respectively. The clips 47a and 47b provide mounting points (e.g., via screws) for mounting or attaching the brake actuator 10 and the center console of the vehicle.

The brake actuator 10 has a manual actuator or manual input lever 14 configured for rotation about a pivot point. The pivot point is provided on an axis A. Input lever 14 is mounted for pivotal movement with respect to the first mounting bracket 12 in opposing brake applying and brake releasing directions. The manual input lever 14 is configured to be provided in a first position for installation in the vehicle and to be moved to and provided in a second position for use of the parking brake actuator 10 (to apply and release vehicle brake(s)). Once the brake actuator 10 is installed and after the manual input lever 14 is moved to its second position, the manual input lever 14 is configured to affect movement of the output member 52 for movement between a brake applying direction and a brake releasing direction.

The manual input lever 14 is configured to rotate relative to the first and second mounting brackets 12 and 16. The manual input lever 14 is operatively connected to an output member 52 to affect movement of the output member 52 in brake applying or brake releasing directions. More specifically, output member 52 is constructed to be operatively connected to one or more cables 20 of a cable system 59 for actuating one or more vehicle brakes. The input lever 14 and output member 52 are spaced axially relative to each other. For example, when the manual input lever 14 is configured for use in its second position, it is configured to move the output member 52 through rotation of a pivot member 18 about axis A (further described below) to apply and release tension as it is moved in the brake applying and releasing directions, respectively.

The manual input lever 14 may comprise first and side parts 24a and 24b that are connected to each other and that are configured to enclose parts of the manual input lever 14. The side parts 24a and 24b are provided with a plurality of holes that are configured to be aligned and secured or connected together using connection devices (e.g., pins, rivets, or bolts and nuts). The side parts 24a and 24b are attached such that they move together when the first side part 24a of the manual input lever 14 is moved by a user between an applied or engaged position wherein brake mechanism 66 is actuated and a released position wherein brake mechanism 66 is de-actuated.

Manual input lever 14 comprises a rod 32 with a first end and a second end. The first end of the rod 32 is accessible by a driver or user of the vehicle in the passenger compartment and has a button 26. When the user wishes to move the manual input lever 14 in the releasing direction from an applied position, button 26 must be depressed. The second end of the rod 32 is configured to move a pawl 28 and a sector 34. Pawl 28 is configured to lock rotation of the manual input lever 14 in a position about the axis A. Pawl 28 comprises an opening 19 in its body that receives pivot pin or rivet 30 therethrough, and is configured to pivot about pivot point 44 using pivot pin 30 with the movement of the manual input lever 14 (e.g., via movement of rod 32). Sector 34 is provided to work in cooperation with pawl 28 to lock manual input lever 14. Sector 34 comprises a plurality of gear teeth 35 on its edge to engage a portion of pawl 28. The teeth 35 on sector 34 are directionally disposed so that pawl 28 (and thus the manual input lever) may travel in a ratcheting action in only the brake applying direction (with the pawl 28 ratcheting over the teeth 35 of sector 34).

The vertical section 36b of second mounting bracket 16 is configured to receive sector 34. The sector 34 can be connected to the vertical section 36b via an attachment device relative to the pawl 28 such that the portion of the pawl 28 can move relative to and engage teeth 35. Alternatively, vertical section 36b of second mounting bracket 16 and sector 34 can be one piece.

Pivotal motion is translated to pawl 28 from rod 32 of manual input lever 14 such that pawl 28 pivots about pawl rivet 30 at pivot point 44, causing pawl 28 and teeth 35 of sector 34 to disengage sufficiently to allow travel of the actuator lever 14 in either direction (i.e., brake applying or brake releasing direction). One or more springs 62 may be provided at a connection point 50 to bias the pawl 28 into engagement with the teeth 35 of sector 34, and as the lever 14 is pivoted upwardly in a brake applying direction, the pawl 28 will ratchet over those teeth 35 and then maintain the lever 14 at the selected position against movement in the brake releasing direction under the tension in the parking cable(s). Thereafter, the lever 14 may be released by pushing the button 26 inwardly against the bias of spring 62 to move the rod 32 to disengage the pawl 28 from the teeth 35 of sector 34, and thus allow for the return of the lever 14 in the brake releasing direction to the applied direction via rotation in the corresponding direction. Other structures for releasing the pawl besides button 26, and other position control devices besides a pawl 28, may be used. The invention is not limited to the construction illustrated in this respect.

In an embodiment, side parts 24a and 24b may be affixed to each other by the pawl pivot pin or rivet 30, although other attachment mechanisms may optionally be used. Side parts 24a and 24b may include openings for receiving pawl pivot pin 30. In one embodiment, the pawl rivet 30 extends through each of the side parts 24a and 24b and the pawl 28. The side parts 24a and 24b can be further connected to each other using pin 46 and/or one or more attachment devices 54 through corresponding openings. Pin 46 may also extend through rod 32 to assist in movement of the manual input lever 14 in its applying and releasing directions. Any number of holes or openings and attachment devices may be provided to secure side parts 24a and 24b to each other.

A pivot member 18 is operatively connected to manual input lever 14 and is configured for rotation about axis A by the lever 14. When the manual input lever 14 is pivoted about its pivot point 44, pivot member 18 is rotated about axis A. Pivot member 18 is configured to rotate relative to first and second mounting brackets 12 and 16. Rotation of pivot member 18 affects output to output member 52, which in turn affects application of the vehicle brakes.

A body of pivot member 18 comprises a first end 21 and a second end 23. In accordance with an embodiment, pivot member 18 comprises an opening 17 at one end 21 or 23 thereof. In another embodiment, pivot member 18 comprises an opening 17 at both of its ends 21 and 23. In yet another embodiment, pivot member 18 comprises an elongate opening extending therethrough (from first end 21 through second end 23) (e.g., a tube). However, it is also envisioned that pivot member may be a solid member, such as a rod. Accordingly, the configuration of pivot member 18 should not be limited. For illustrative purposes only, the FIGS. and the following description describe a pivot member 18 as a tube-like structure.

Pivot member 18 is configured to be inserted through respective holes 48a and 48b of side parts 24a and 24b of manual input lever 14. Pivot member 18 may be formed such that during assembly of the parts of the brake actuator 10, end 23 of the pivot member 18 is fit through holes 48a and 48b and secured for rotational movement with the connected side parts 24a and 24b of the manual input lever 14. In one embodiment, the pivot tube is secured via one or more welds to the side parts 24a and 24b. Additionally and/or alternatively, other attachment devices (e.g., adhesive) may be used. In another embodiment, the pivot member 18 and holes 48a and 48b may be formed from corresponding shapes that enable insertion of the pivot member 18 but prevent rotation of the pivot member 18 relative to the side parts 24a and 24b. For example, the body of pivot member 18 and the holes 48a and 48b may comprise non-circular cross sections made of polygonal shapes (e.g., square, hexagon, etc.). Other shapes may also be used.

Second end 23 of pivot member 18 is provided through receiving hole 58 of second mounting bracket 16 and is configured for rotational movement therein (i.e., relative to second mounting bracket 16). To secure pivot member 18 from withdrawal, a securement device 60 is connected to second end 23 of the pivot member 18 after it is inserted through the hole 48b of second side part 24b. That is, securement device 60 is provided on an outer side of second side part 24b to prevent end 23 from being withdrawn from hole 48b while still allowing for rotation of the body of pivot member 18 within receiving hole 58 of second mounting bracket 16. In an embodiment, securement device 60 may connect to end 23 of pivot member 18 by extending through hole 48b and into opening 17 of pivot member 18. In another embodiment, securement device 60 may connect to an end 23 by surrounding an outside surface of the pivot member 18. The methods for connecting securement device 60 are not limited.

First end 21 of pivot member 18 is inserted through one or more openings 25 of a bracket 22 configured to operatively affect output member 52. First end 21 is secured relative to bracket 22 such that the pivot member 18 does not rotate relative to the bracket 22 itself, but, rather, translates rotational movement of the pivot member 18 to the output member 52 via bracket 22. In an embodiment, pivot member 18 may be formed and sized such that an end 21 of the pivot member 18 is fit through each of the openings 25 and thus secured for rotational movement with bracket 22 about axis A. In an embodiment, bracket 22 may also be secured to pivot tube 18 via weld(s) or other attachment devices (e.g., adhesive). In another embodiment, the pivot member 18 and openings 25 may comprise corresponding but alternative shapes that enable insertion of the pivot member 18 but prevent rotation of the pivot member 18 relative to the bracket 22. For example, the body of pivot member 18 and the openings 25 may comprise non-circular cross sections made of polygonal shapes (e.g., square, hexagon, etc.). Other shapes may also be used. Additionally, in an embodiment, a part 74 of a retainer 70 may be further configured to lock or secure pivot member 18 from withdrawal and disassembly from the parts. During installation, to secure pivot member 18 rotationally relative to first mounting bracket 12, a part 72 of retainer 70 is used.

The bracket 22 includes additional openings 27 for receiving a transfer device 31 therein that is configured to move or rotate based on the rotation of pivot member 18 and transfer its motion to brake mechanism 66. The transfer device 31 receives output member 52 therethrough and the output member 52 is secured relative to bracket 22 using bushing 29 and bolt 33. The output member 52, which takes the form of a threaded rod 52 in the illustrated embodiment of FIG. 1, is configured to receive transferred motion from movement of the pivot member 18 and bracket 22, and in turn translate such motion to the cables 20 of the brake mechanism 66 (shown in FIG. 8) to apply or release the vehicle brakes. The bracket 22 also includes an opening 37 to compensate for movement of a portion of the output member 52 therein as the bracket 22 is rotated.

In an embodiment, on one end of the threaded rod 52 (connected to the cable system 59) an equalizer 65 (e.g., see FIG. 8) may be provided to distribute tension substantially equally to cables 20 of the brake mechanism 66.

In an embodiment, a cam may optionally be used for coupling the cable to the lever, and the invention is not limited to the illustrated construction. For example, the brake actuator 10 may have a cam construction as described in U.S. patent application Ser. No. 11/349,186, hereby incorporated by reference in its entirety.

Figure 5:
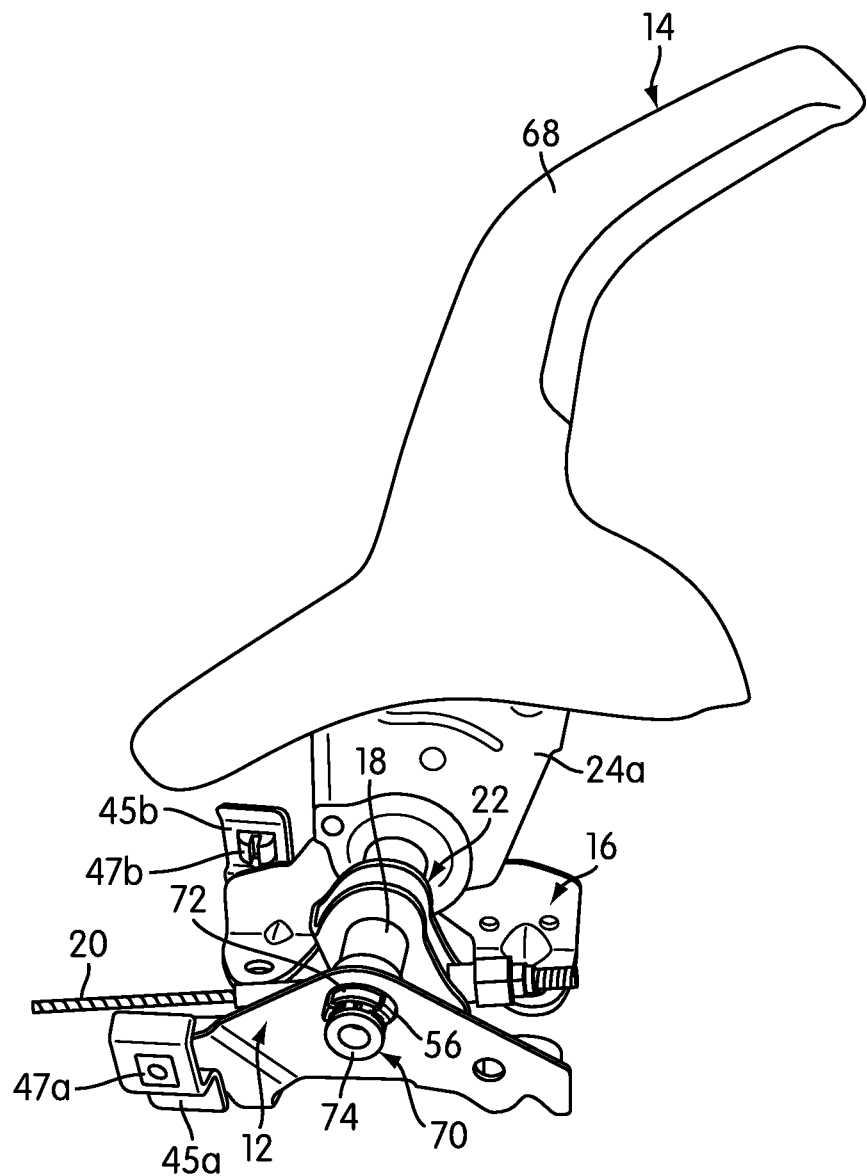
FIG. 5 is a side view of the parking brake actuator as assembled with its lever rotated to a second position.

Also, the herein described parts of the parking brake actuator 10 may be made of any number of materials. In an embodiment, mounting brackets 12 and 16, pivot member 18, and manual input lever 14 can be made from any number of suitable materials, including metal (e.g., steel, aluminum, magnesium), plastic, strong rubber, composite materials, or any combination thereof. In an embodiment, a molded plastic covering 68 may be provided over the assembled parts of the manual input lever 14 (see, e.g., FIGS. 3 and 5) for aesthetic purposes in the passenger compartment, as well as to assist in containing the parts of the lever.

As previously mentioned, pivot member 18 is operatively connected to manual input lever 14. Both are configured for rotation relative to first mounting bracket 12 and second mounting bracket 16. Generally, such parts of the brake actuator 10 are pre-assembled for delivery and/or installation. During delivery and/or installation, however, rotation of the pivot member 18 and lever 14 relative to first and second mounting brackets 12 and 16 is undesirable. For example, movement of the brake actuator 10 parts may result parts disassembling (e.g., falling off of the pivot member 18) and/or freely rotating relative to each other while it is being handled by an assembly operator. This can make installation and assembly of parking brake actuator 10 more difficult and time consuming, and also increase the risk of the brackets 12 and 16 being damaged while it is being transported, handled, and assembled. Retainer 70 is configured to reduce and/or eliminate such handling and installation problems.

Figure 2A:
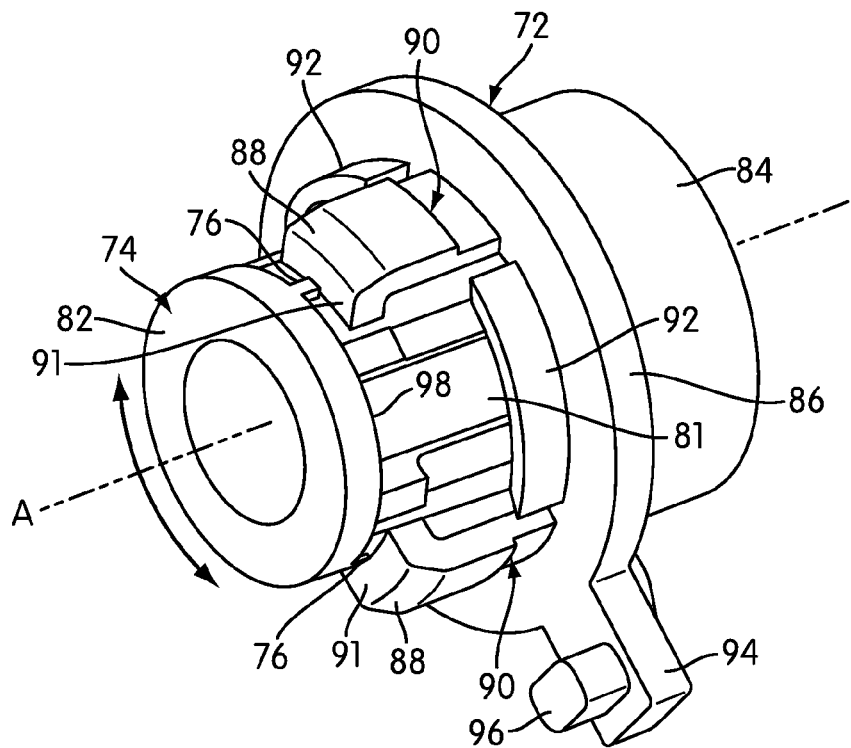
FIGS. 2A and 2B are detailed perspective views of a front and back of a break-away retainer used to install the parking brake actuator in a vehicle in accordance with an embodiment of the disclosure.
Figure 2B:
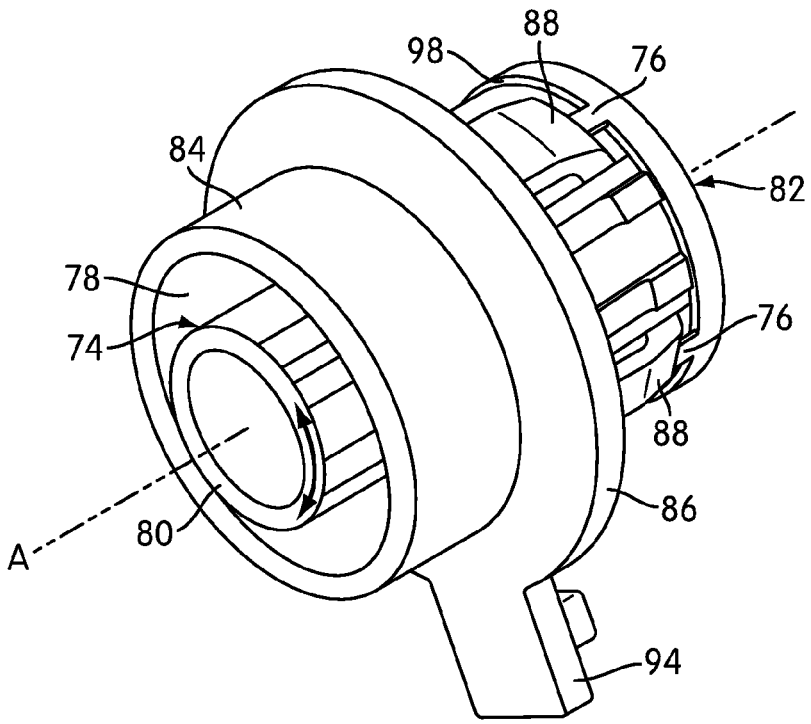

Specifically, FIGS. 2A and 2B illustrate detailed perspective views of front and back ends of a break-away retainer 70 in accordance with an embodiment. Retainer 70 is configured to temporarily retain, fix or secure pivot member 18 and thus input lever 14 of parking brake actuator 10 from rotation relative to mounting bracket 12 during transportation and during installation of the brake actuator 10. It also allows for its parts to break away from each other via breaking of the temporary fix so that the actuator 10 can be used to apply and release brakes of a vehicle. Retainer may be in the form of a bushing, for example. Retainer comprises a first part 72 and a second part 74 connected via at least one frangible connection 76. The frangible connection(s) temporarily hold first and second parts 72 and 74 (respectively) together and prevent movement of the parts 72, 74 relative to each other. The frangible connection(s) 76 are configured to shear and allow first part 72 and second part 74 to break away from each other after installation, upon application of rotational force thereto (through application of a threshold force to the input lever 14), thereby enabling parking brake actuator 10 to be configured for use to apply or release a braking action.

The first part 72 and the second part 74 of the break-away retainer 70 are generally cylindrical in shape and each comprises a body having an outer surface and an inner surface. First part 72 comprises a body with a first end 84, a stop ledge 86, and one or more tabs 88 at a second end. The stop ledge 86 extends laterally or radially from the body and is positioned about outer surface of body. The one or more tabs 88 are configured to secure or lock first part 72 relative to first mounting bracket 12, e.g., in corresponding receiving hole 56. The one or more tabs 88 extend forwardly in the axial direction, and in a direction perpendicular to the radial direction of stop ledge 86. Each one of the tabs 88 includes a lock edge 90 on its outer surface and a stop edge 91 at a top portion thereof.

To connect retainer 70 to first mounting bracket 12, the second end (shown in FIG. 2A) is aligned with and pushed or inserted through hole 56 of the bracket 12. The one or more tabs 88 on the second end of first part 72 are configured to resiliently bend inwardly (towards axis A) during insertion and are configured to bend back after being pushed through hole 56 so as to snap-fit and thus lock the first part 72 to the bracket 12 using the corresponding lock edges 90 of the one or more tabs 88. The lock edges 90 of each of the tabs 88 are positioned on a first side of the first mounting bracket 12 and prevent withdrawal of the retainer 70, while the stop ledge 86 is positioned on a second (opposite) side. In some embodiments, gluing and/or press fitting can be implemented to attach first part 72 to first mounting bracket 12.

Figure 7:
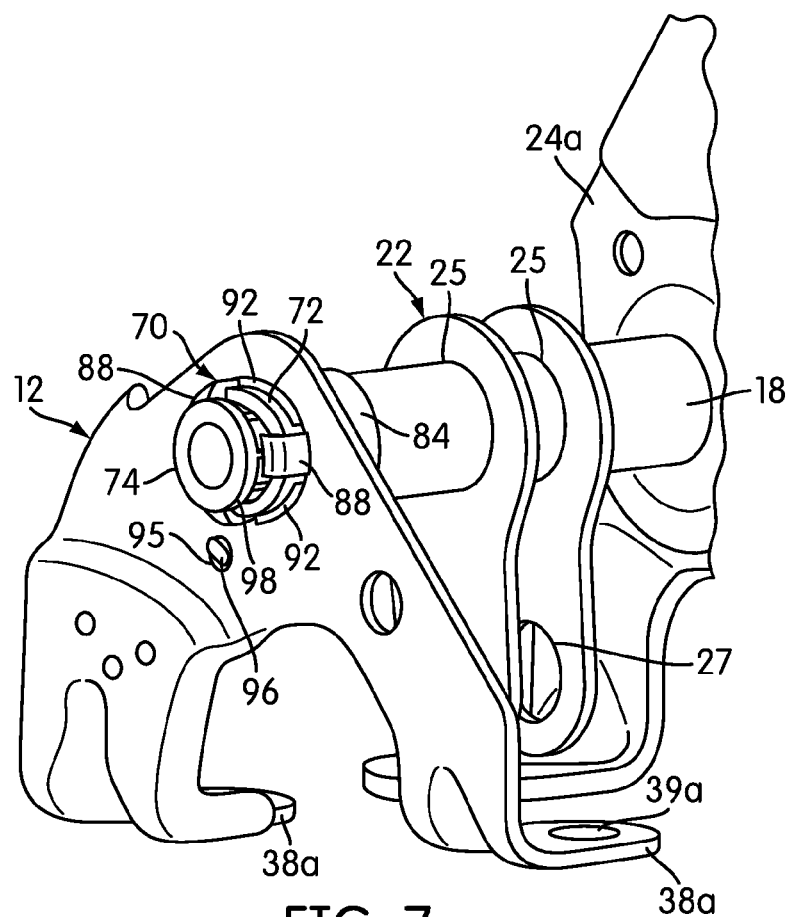
FIG. 7 illustrates a perspective view of the retainer, mounting bracket, and pivot member connection of the parking brake actuator as assembled in a vehicle (in a released position)

As shown, in an embodiment, first part 72 may further include additional attachment parts 92 configured to assist in attachment of the retainer 70 to first mounting bracket 12. Any number of attachment parts 92 may be provided. In an embodiment, for example, the attachment parts 92 may be formed between each one of the tabs 88. The attachment parts 92 may be formed such that each of their outer surfaces is configured to frictionally fit against an inner surface of the receiving hole 56 of the first mounting bracket 12 (e.g., see FIG. 7) when inserted and assembled therewith.

Furthermore, in the illustrated embodiment, an additional lock device is provided on first part 72 for its securement to first mounting bracket 12. For example, as illustrated in FIG. 2A, stop ledge 86 includes an extension 94 with lock device 96 in the form of a pin. Lock device 96 is configured to be inserted into a corresponding opening or hole 95 on first mounting bracket 12 (see FIG. 7). As further detailed below, lock device 96 enables the relative rotation of first part 72 and second part 74 during application of rotational force from manual lever 14 and tube 18 such that second part 74 rotates with the pivot tube 18 and thus the frangible connection(s) 76 are sheared.

In an embodiment, at least a portion of the body of the first part 72 is configured to surround a portion of the body of the second part 74. That is, second part 74 is configured to fit within first part 72 such that its outer surface is spaced from but adjacent to inner surface of first part 72. For example, as shown in FIG. 2B, a space 78 is provided between outer surface of second part 74 and inner surface of first part 72. As further detailed below, this space 78 is used to mount the parts 72 and 74 of the retainer 70 to end 21 of the pivot member 18.

Second part 74 comprises a body 81 of generally tubular construction with an attachment portion 80 at its first end. Attachment portion 80 is generally circular in shape and is formed to attach to pivot member 18. In an embodiment, attachment portion 80 is formed and sized such that its outer surface can be pressed and frictionally fit within opening 17 of pivot member 18 to secure or lock second part 74 to the pivot member 18. When attachment portion 80 is aligned with and inserted into opening 17, first end 21 of pivot member is positioned relative to a space 78 between the first and second parts 72 and 74 (respectively) so that the attachment portion 80 is press fit within opening 17 of pivot member. In an embodiment, adhesive, overmolding or other connection devices/methods can additionally or alternatively be used to connect or bond portion 80 to the tube 18.

Although the first end 84 of the body of first part 72 may surround the outer surface of the pivot member 18 when the tube and retainer 70 are assembled together, the end 21 of the pivot member 18 is not configured to be frictionally fit against the inner surface of the body. Rather, it is formed such that there is a space therebetween. That way, when the manual input lever 14 is positioned in its second position for brake use, end 21 is configured to rotate within and relative to body of first part 72.

In an embodiment, outer surface of attachment portion 80 may further include structural forms, designs, or shapes extending radially therefrom configured to assist in its friction or other type of fit within opening 17 of pivot member 18. In another embodiment, attachment portion 80 and inner surface of pivot member 18 comprise complimentary surfaces for alignment and securement. In yet another embodiment, attachment portion 80 is formed and sized such that it surrounds end 21 of pivot member 18.

Referring back to the Figures, a second end 82 of second part 74 of retainer 70 is configured to secure or lock second part 74 relative to first mounting bracket 12 (e.g., in corresponding receiving hole 56). More specifically, second end 82 is configured to prevent withdrawal of the second part 74 from the first part 72. End 82 may include a lock ledge 98 that extends laterally or radially from the body 81 and is positioned about outer surface of body 81. Lock ledge 98 is configured to extend in a radial direction such that should the second part 74 move longitudinally relative to first part 72 (e.g., when the brake actuator 10 is ready for use), the lock ledge 98 will engage stop edge(s) 91 of one or more adjacent tabs 88 and prevent withdrawal of the second part 74 (and thus the disconnection of pivot member 18 from first mounting bracket 12). That is, ledge 98 can be used to prevent disconnection of first and second parts 72 and 74 at least in a longitudinal direction (e.g., longitudinally along axis A, such that second part 74 can not be withdrawn through the opening in first part 72).

As previously noted, first and second parts 72 and 74 are temporarily held together relative to each other using the at least one frangible connection 76. The frangible connection(s) 76 connect the first part 72 and the second part 74 together. In the illustrated embodiment of FIG. 2, a plurality of frangible connections 76 are provided. For example, the plurality of frangible connections 76 may be spaced circumferentially around and between the first and second parts 72 and 74. While the frangible connection(s) are intact (see FIGS. 2A and 4), first and second parts 72 and 74 can not rotate relative to each other. Thus, once both parts 72 and 74 are attached to the first mounting bracket 12 and the pivot member 18, respectively, the retainer 70 and the pivot member 18 are aligned and rotationally locked (e.g., relative to rotation axis A), thereby preventing relative movement of input lever 14 to mounting bracket 12. The frangible connections 76 are configured to break, sever, or shear upon application of a rotational threshold force being applied to pivotally move the manual input lever 14 and pivot member 18 relative to the mounting bracket 12 (which transfers rotational force to the second part 74 relative to the first part 72). Lock device 96 assists in holding first part 72 mounted to first mounting bracket 12 at its location, and to resist rotational movement (so that second part 74 rotates relative to first part 72). After the force shears the frangible connection(s) 76, second part 74 is configured to rotate relative to first part 72 (see FIG. 6), thereafter permitting movement of the input lever 14 in the brake applying and brake releasing directions.

In an embodiment, the at least one frangible connection 76 extends from an inner surface or edge of the first part 72 to an outer surface or edge of the second part 74. This may prevent accidental shearing or breaking of the connections 76 during movement or installation, for example. For example, as shown in FIG. 2A, each frangible connection 76 may extend from an inside of stop edge 91 of each tab 88 of first part 72 and to a portion of lock ledge 98 at second end 82 of the second part 74.

The illustrated design as shown in FIGS. 2A-2B of the parts 72 and 74 of the retainer 70, however, is not meant to be limiting. For example, stop ledge 86 may be a continuously formed extension provided around the part 72, as shown in FIG. 2A, or it may be a plurality of extensions that extend laterally from the body. Also, any number of frangible connections 76 may be used, and their location for connecting and preventing rotation of first and second parts 72 and 74 during installation should not be limiting. Also, the shape of the retainer 70, including its surfaces, should not be limited to those illustrated in the Figures. For example, although first part 72 and second part 74 are shown with generally round or circular shapes, it should be understood that parts of retainer 70 may be non-circular or polygonal, or comprise patterned, textured or smooth surfaces, as well as other configurations.

Figure 3:
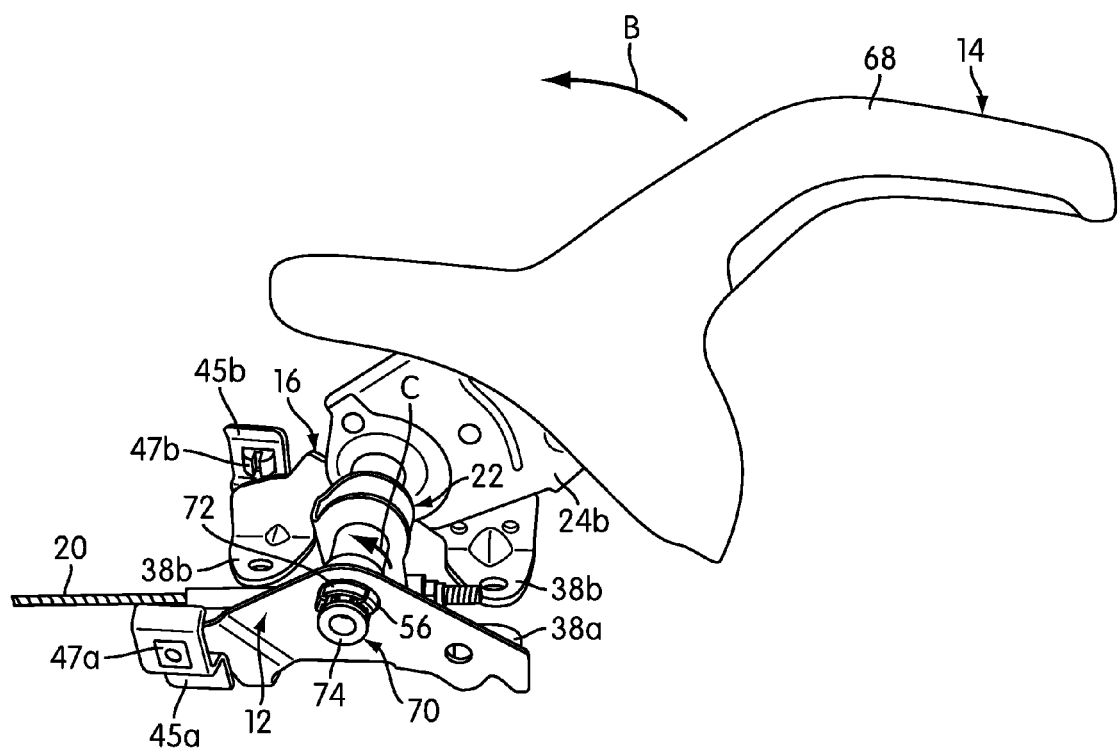
FIG. 3 is a side view of the parking brake actuator as assembled with its lever in a first position.
Figure 4:
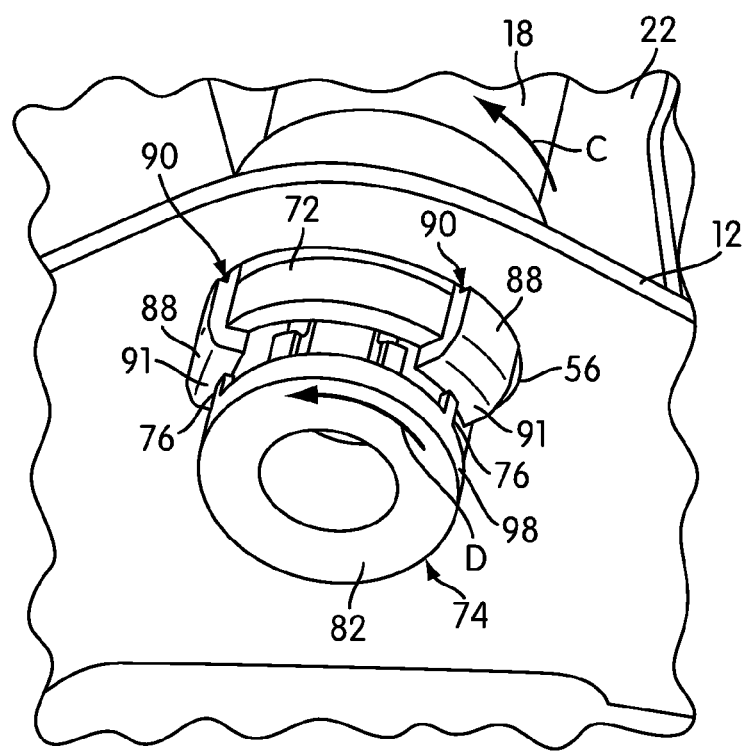
FIG. 4 is a detailed view of the retainer, mounting bracket, and pivot member connection of the parking brake actuator of FIG. 3 in the first position.

FIGS. 3-6 illustrate the steps for installing the brake actuator 10 within a passenger compartment of a vehicle using the retainer 70. Generally, the brake actuator 10 is assembled (and delivered, if needed). In the assembly, the first part 72 of the retainer 70 is attached to first mounting bracket 12 and the second part 74 is attached to first end 21 of pivot member 18. The pivot member 18 and manual input lever 14 are locked from rotation relative to the mounting brackets 12 and 16. The manual input lever 14 is provided in a first position for installation. FIG. 3 shows a side view of the parking brake actuator 10 as assembled with retainer 70 and with its lever in a first position. FIG. 4 shows a detailed view of the retainer 70, first mounting bracket 12, and pivot member 18 connected together. As shown, the lock edges 90 are used to connect and hold first part 72 to mounting bracket 12. Second part 74 remains secured to first part 72 via frangible connections 76.

The parking brake actuator 10 may then be installed into the passenger compartment of the vehicle using the first mounting bracket 12 and second mounting bracket 16, e.g., via securing horizontal bases 38a and 38b to a floor of the passenger compartment using attachment devices such as fasteners in openings 39a and 39b. The output member 52 is connected to the cable system 59 of brake mechanism 66.

Figure 6:
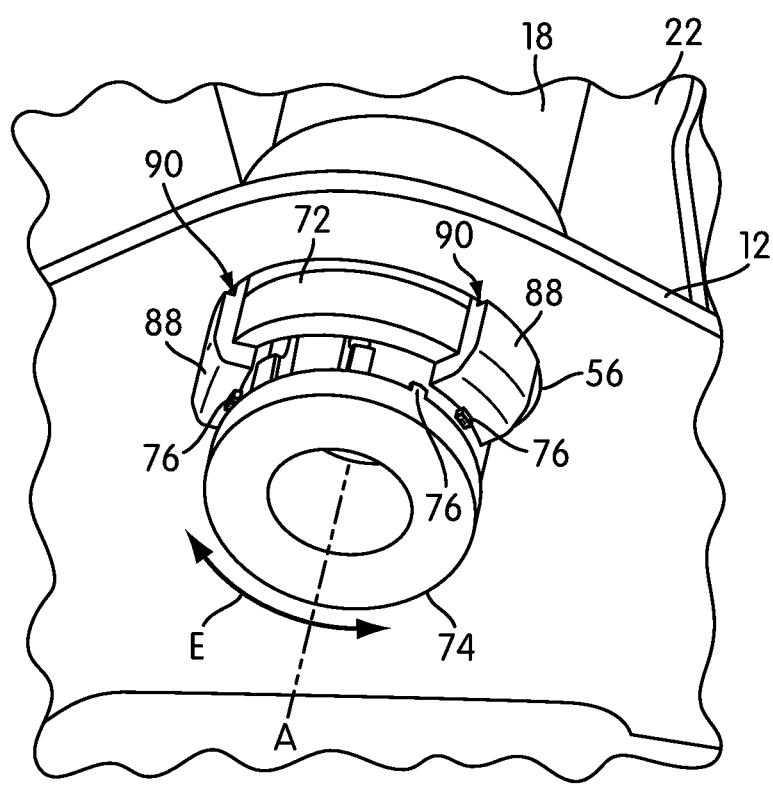
FIG. 6 is a detailed view of the retainer, mounting bracket, and pivot member connection of the parking brake actuator of FIG. 5 in the second position.

After securement of the brackets 12 and 16 (and related parts) of the parking brake actuator 10 within the vehicle (and with the cable system), the manual input lever 14 is moved about its pivot point as indicated by arrow B (e.g., by grasping covering 68 and pulling) from its first position for installation (shown in FIG. 3) to a second position for use of the parking brake actuator 10 (shown in FIG. 5) in its brake applying and brake releasing positions. The movement of the manual input lever correspondingly rotates the pivot member 18 about axis A, as indicated arrow C in FIGS. 3 and 4, which causes the second part 74 of the retainer 70 to also rotate about axis A, as indicated by arrow D. In an embodiment, when the lever is moved, the outer surface of the second part 74 rotates relative to at least part of the inner surface of the first 72 of the retainer 70. Accordingly, the frangible connections 76 of the retainer 70 are sheared or broken once the rotational force is transferred via pivot member 18. The first part 72 of the retainer 70 remains attached to the first mounting bracket 12 without rotating about the axis A. FIG. 6 shows a detailed view of the sheared frangible connections 76 of the retainer 70 once the manual input lever 14 and pivot member 18 are moved to the second position.

After its movement from the first position to the second position, the manual input lever 14 is configured for movement in brake applying and brake releasing directions by being operatively connected to the output member 52. The second part 74 of the retainer bushing can rotate relative to the first part 72 and with the pivot member 18 about axis A in either direction, as indicated by arrow E in FIG. 6.

Movement of the manual input lever 14 to apply and release brake mechanism 66 is known, and therefore is only generally described herein. To move the manual input lever 14 to the applied brake position, the operator pulls on the manual input lever 14 (e.g., in a clockwise direction) so that the pawl 28 and the manual input lever 14 may travel in a ratcheting action in the applying direction (such that the pawl 28 ratchets and locks in the teeth 35 of sector 34 and prevents the manual input lever 14 from moving back towards the released position). When the manual input lever 14 is pivoted, this in turn causes the pivot member 18 and bracket 22 to rotate, and then threaded rod 52 to be pulled. The movement of the threaded rod 52 (and the equalizer 56) causes the cables 20 to be pulled, thus actuating the brake mechanism 66.

To release the brake mechanism 66, the button 26 is depressed, allowing pawl 28 to pivot about pawl rivet 30 and disengage from sector 34 to sufficiently to allow travel of the manual input lever 14 in either direction (about its pivot point). When the manual input lever 14 is pivoted to the release position, the threaded rod 52 is moved to effectively release or de-actuate the brake mechanism 66 of the vehicle.

In accordance with an embodiment, a switch 49 (see FIG. 1) is mounted to at least one of the mounting brackets (e.g., second mounting bracket 16) by an attachment device 54 (e.g., screw). This is so that when the park brake controller is released to the home (down) position as described above, the switch 49 is opened, and an associated park brake light indicating application of the park brake (e.g., provided on the dashboard) turns off. Alternatively, when the park brake is applied (e.g., up in an applying application), the switch 94 is closed and the park brake light on the dash turns on, indicating application of the park brake.

FIG. 8 is a schematic of a motor vehicle 64, showing brake actuator 10, cables 20, and brake mechanism 66. As shown in this Figure, the brake actuating system includes a cable system 59 that is operatively connected to the brake mechanism 66 such that increasing tension in the cable system 59 actuates the brake mechanism 66, and decreasing tension in the cable system 59 de-actuates the brake mechanism 66. The cable system 59 may include a plurality of flexible cables slideably received in flexible conduits. Typically, these cables are connected to an equalizer 56. These cables may include a pair of relatively longer cables 20 that are connected between the equalizer 56 and the vehicle brake mechanism 66. These connections enable movement of the manual input lever 14 of the parking brake actuator 10 in the brake applying and releasing directions to increase and decrease the tension in the cable system 59. As previously noted, the equalizer 56 functions to distribute tension equally to the cables 20. However, any other suitable output side tab member may be provided to operatively connect the threaded rod 52 to the remainder of the cable system 59. The cable system may have any suitable layout and the illustrated embodiment is not intended to be limiting. The point for attachment of the cable system 59 to the mechanical components of the actuator 10 may be provided by any suitable structure, and the example herein is not limiting.

The herein disclosed retainer 70 provides an easy, clean, and relatively simple device for limiting movement of the mounting bracket during delivery and/or assembly of the parking brake actuator, without adding a significant amount of time to the installation process. The design of the disclosed retainer 70 allows parts of the parking brake actuator 10 to be assembled and remain in a fixed position (relative to each other) until assembly into the end product (vehicle) is complete. It locks movement relative the first mounting bracket 12 and does not allow it to slide on the pivot member 18 until the assembly has been actuated after installation into the vehicle. This greatly reduces assembly effort as the parts do not move or separate during handling or assembly. Additionally, assembly operators do not have to remove any locking devices, pins, or other devices or materials that may be typically used to fix the brake actuator assembly during transport and assembly. Moreover, user injury (e.g., from pinching or rotation of parts) is reduced or prevented.

The first actuation of the manual input lever 14 from its first position to its second position unlocks the retainer 70 and allows for movement for use in the brake applying and brake releasing directions. The retainer bushing also stays connected to the mounting brackets without inhibiting or limiting use of the parking brake, thereby requiring less clean up. The retainer 70 also requires no need to reconfigure, resize, or redesign existing parts of the brake actuator, because the parts of the retainer 70 are sized according to existing bracket and parking brake actuator assembly parts. For example, the first part 72 is formed to fit into receiving hole 56 of first mounting bracket 12, and the attachment part 80 of second part 74 is formed to fit within opening 17 of pivot member 18.

It should be understood that not all parts of the brake actuator 10 may be shown and/or described in detail. For example, as would be understood by one of ordinary skill in the art, the brake actuator 10 may include one or more bushings attached to its parts so as to reduce wear therebetween. Accordingly, the illustrated and generally described parts of the brake actuator 10 are not meant to be limiting.

While the principles of the invention have been made clear in the illustrative embodiments set forth above, it will be apparent to those skilled in the art that various modifications may be made to the structure, arrangement, proportion, elements, materials, and components used in the practice of the invention.

The foregoing illustrated embodiment has been provided solely for the purpose of illustrating the structural and functional principles of the present invention, and it is not intended to be limiting. To the contrary, the present invention is intended to encompass all variables, modifications, alterations, substitutions, and equivalents within the spirit and scope of the following claims.

What is claimed is:

1. A brake actuator for use in a motor vehicle having one or more vehicle brakes actuable by a cable system with one or more cables, comprising:
   a mounting bracket configured for attachment within a passenger compartment of the vehicle;
   a pivot member configured for rotation about an axis and operatively connected to an input lever;
   the input lever configured for rotation in opposing brake applying and releasing directions and configured to rotate the pivot member about its axis;
   an output member movable by the input lever and constructed to be operatively connected to the one or more cables of the cable system to apply and release tension as the input lever is moved in the brake applying and releasing directions, respectively; and
   a retainer comprising a first part and a second part connected by at least one frangible connection, the first part of the retainer being connected to the mounting bracket and the second part of the retainer being connected to the pivot member, the second part of the retainer configured to rotate with the pivot member and the at least one frangible connection configured to temporarily retain the pivot member and mounting bracket against relative pivotal movement for installation,
   wherein the at least one frangible connection is configured to break in response to a threshold force being applied to pivotally move the input lever and the pivot member relative to the mounting bracket such that the second part of the retainer rotates relative to the first part of the retainer to thereafter permit movement of the input lever in the brake applying and brake releasing directions, and
   wherein the mounting bracket receives a first part of the retainer within a corresponding hole and wherein the pivot member receives a second part of the retainer within a corresponding opening.

2. The brake actuator of claim 1, wherein the second part is press fit into the corresponding opening of the pivot member.

3. The brake actuator of claim 1, wherein the first part is snap fit into the corresponding hole within the mounting bracket.

4. The brake actuator of claim 1, wherein the first part comprises at least one tab that extends in an axial direction and includes a lock edge configured to lock the first part of the retainer relative to the mounting bracket.

5. The brake actuator of claim 4, wherein at least a portion of the first part of the retainer surrounds a portion of the second part of the retainer.

6. The brake actuator of claim 5, wherein the second part comprises a lock ledge that extends radially from the second part to prevent withdrawal of the second part from the first part via engagement with the at least one tab at least in a longitudinal direction.

7. The brake actuator of claim 6, wherein the at least one frangible connection extends between the at least one tab of the first part and the lock ledge of the second part.

8. The brake actuator of claim 1, wherein the first part of the retainer and the second part of the retainer each comprise a body having an outer surface and an inner surface, and wherein pivotal movement of the input lever is configured to rotate the outer surface of the second part of the retainer relative to the inner surface of the first part of the retainer.

9. The brake actuator of claim 8, further comprising a space between the outer surface of the second part and the inner surface of first part.

10. The brake actuator of claim 8, wherein the at least one frangible connection of the retainer extends from the inner surface of the first part to the outer surface of the second part.

11. The brake actuator of claim 1, wherein the input lever is spaced axially from the output member.

12. A brake actuator for use in a motor vehicle having one or more vehicle brakes actuable by a cable system with one or more cables, comprising:
    a mounting bracket configured for attachment within the passenger compartment of the vehicle;
    an input lever configured for rotation in opposing brake applying and releasing directions and connected to the mounting bracket, the input lever being provided in a first position for installation in the vehicle and configured to be moved to a second position for use to apply and release the one or more vehicles brakes;
    a pivot member configured for rotation about an axis connected to the mounting bracket and operatively connected to the input lever, the input lever configured to rotate the pivot member about its axis;
    an output member constructed to be operatively connected to the one or more cables of the cable system and spaced axially from the input member, with the pivot member being operatively connected to the output member to affect its movement in the brake applying and releasing directions; and
    a retainer comprising a first part and a second part connected by one or more frangible connections, the first part of the retainer being connected to the mounting bracket and the second part of the retainer being connected to an end of the pivot member,
    wherein the retainer limits rotation of the pivot member and the input lever relative to the mounting bracket, and wherein, upon movement of the input lever to its second position, the pivot member is configured to rotate about its axis to rotate the second part of the retainer thereby breaking the one or more frangible connections between the first part and the second part, such that the input lever is configured for use in brake applying and brake releasing directions,
    wherein the one or more frangible connections are configured to break in response to a threshold force being applied to the input lever for pivotal movement relative to the mounting bracket to its second position, and
    wherein the mounting bracket receives a first part of the retainer within a corresponding hole and wherein the pivot member receives a second part of the retainer within a corresponding opening.

13. The brake actuator of claim 12, wherein the second part is press fit into the corresponding opening of the pivot member.

14. The brake actuator of claim 12, wherein the first part is snap fit into the corresponding hole within the mounting bracket.

15. The brake actuator of claim 12, wherein the first part comprises at least one tab that extends in an axial direction and includes a lock edge configured to lock the first part of the retainer relative to the mounting bracket.

16. The brake actuator of claim 12, wherein at least a portion of the first part of the retainer surrounds a portion of the second part of the retainer.

17. The brake actuator of claim 16, wherein the second part comprises a lock ledge that extends radially from the second part to prevent withdrawal of the second part from the first part at least in a longitudinal direction.

18. The brake actuator of claim 17, wherein the frangible connection extends between the first part and the lock ledge of the second part.

19. The brake actuator of claim 12, wherein the first part of the retainer and the second part of the retainer each comprise a body having an outer surface and an inner surface, and wherein movement of the input lever is configured to rotate the outer surface of the second part of the retainer relative to the inner surface of the first part of the retainer.

20. The brake actuator of claim 19, further comprising a space between the outer surface of the second part and the inner surface of first part.

21. The brake actuator of claim 19, wherein the at least one frangible connection of the retainer extends from the inner surface of the first part to the outer surface of the second part.

22. A brake actuator for use in a motor vehicle having one or more vehicle brakes actuable by a cable system with one or more cables, comprising:
 a mounting bracket configured for attachment within a passenger compartment of the vehicle;
 an input lever mounted for pivotal movement with respect to the mounting bracket in opposing brake applying and releasing directions;
 an output member movable by the input lever and constructed to be connected to the one or more cables of the cable system to apply and release tension as the input lever is moved in the brake applying and releasing directions, respectively; and
 a retainer having a first part fixed with respect to the mounting bracket and a second part fixed with respect to the input lever, the first and second parts being connected by a frangible connection to temporarily retain the input lever and mounting bracket against relative pivotal movement for installation, wherein the frangible connection is configured to break in response to a threshold force being applied to pivotally move the input lever relative to the mounting bracket to thereafter permit movement of the input lever in the brake applying and brake releasing directions,
 wherein at least a portion of the first part of the retainer surrounds a portion of the second part of the retainer, and
 wherein the first part and the second part are substantially cylindrical in shape and wherein a space is provided between the first part and the second part.

23. The brake actuator of claim 22, wherein the second part comprises a lock ledge that extends radially from the second part to prevent withdrawal of the second part from the first part at least in a longitudinal direction.

24. The brake actuator of claim 22, wherein the retainer comprises a plurality of frangible connections with spaces therebetween, the plurality of frangible connections spaced circumferentially around and between the first and second parts.

25. The brake actuator of claim 22, further comprising a pivot member configured for rotation about an axis that is operatively connected to the input lever and the output member, such that movement of the input lever rotates the pivot member and wherein rotation of the pivot member affects movement of the output member.

26. The brake actuator of claim 25, wherein the first part of the retainer is attached to the mounting bracket and wherein the second part of the retainer is attached to the pivot member such that the retainer limits rotation of at least the pivot member relative to the mounting bracket, wherein upon application of the threshold force, the pivot member is configured to rotate about its axis such that the second part of the retainer is configured to rotate with the rotation of the pivot member relative to the first part of the retainer.

* * * * *